(12) United States Patent
Willkens et al.

(10) Patent No.: US 6,297,183 B1
(45) Date of Patent: Oct. 2, 2001

(54) AGING RESISTANT POROUS SILICON CARBIDE CERAMIC IGNITER

(75) Inventors: Craig A. Willkens, Sterling; Normand P. Arsenault, Holden, both of MA (US); James Olson, Windham, NH (US); Roger Lin, Shrewsbury, MA (US)

(73) Assignee: Saint-Gobain Ceramics and Plastics, Inc., Worcester, MA (US)

( * ) Notice: Subject to any disclaimer, the term of this patent is extended or adjusted under 35 U.S.C. 154(b) by 0 days.

(21) Appl. No.: 09/362,479

(22) Filed: Jul. 28, 1999

(51) Int. Cl.[7] .................................................. C04B 35/569
(52) U.S. Cl. ................................ 501/88; 501/89; 428/404
(58) Field of Search ........................ 501/88, 89; 428/404

(56) References Cited

U.S. PATENT DOCUMENTS

| | | | |
|---|---|---|---|
| 3,875,477 | 4/1975 | Fredriksson et al. | 317/98 |
| 4,187,344 | 2/1980 | Fredriksson | 428/304 |
| 4,429,003 | 1/1984 | Fredriksson et al. | 428/317.9 |
| 4,564,601 | 1/1986 | Kriegesmann et al. | 501/88 |
| 4,771,021 | 9/1988 | Tamamizu et al. | 501/90 |
| 4,859,385 | 8/1989 | Tanaka et al. | 264/62 |
| 4,863,657 | 9/1989 | Tanaka et al. | 264/62 |
| 5,179,049 | 1/1993 | Numata et al. | 501/88 |
| 6,228,481 * | 5/2001 | Yamada et al. | 428/404 |

* cited by examiner

*Primary Examiner*—Karl Group
(74) *Attorney, Agent, or Firm*—Mike W. Crosby

(57) ABSTRACT

This invention relates to an aging resistant SiC igniter having a second layer of recrystallized SiC within the body.

12 Claims, 3 Drawing Sheets

AGING RESISTANT POROUS SILICON CARBIDE CERAMIC IGNITER

BACKGROUND OF THE INVENTION

Silicon carbide electrical heating elements are known to be susceptible to oxidation which substantially changes their electrical properties. U.S. Pat. No. 3,875,477 (Fredrikkson I) discloses an igniter whose porous recrystallized silicon carbide has an internal network of open porosity. This conventional igniter is produced by forming an igniter-shaped green body comprising fine and coarse SiC particles and firing this green body at about 2400° C. in nitrogen. During the firing step, the highly reactive fine SiC particles vaporize and then redeposit on the coarse SiC particles, thereby forming a layer of "recrystallized" SiC which both coats and connects the coarse SiC particles. An example of this conventional recrystallized structure is shown in FIG. 1.

During use, the oxidizing atmosphere surrounding this igniter penetrates the igniter's porosity, the silicon carbide at the surface of these pores reacts with the oxygen to form silica, an electrical insulator, thereby decreasing the conductive cross-section of the SiC igniter, resulting in decreased amperage and an increased resistance (at a fixed voltage). This phenomenon is known as "aging". It has been found that the conventional recrystallized SiC igniter ages to such an extent that its resistivity increases over 6–12% after only 6000 hours of cycling (5 minutes on, 5 minutes off) at a service temperature of 1480° C.

One proposal for minimizing the effects of oxidative aging in electrically conductive refractory bodies is described in U.S. Pat. No. 4,187,344 (Fredrikkson II). Porous SiC heating elements are coated with silicon nitride and/or silicon oxynitride particles in a liquid slurry and these particles are carried into the pores of the element to a depth of at least 6.4 mm. After the slurry has dried, the article is fired at about 1000° C. to fix the silicon oxynitride or silicon nitride particles in place and form a barrier against undue oxidation. However, it was found in practice that water vapor and combustion products detrimentally react with the submicron sized silicon nitride/silicon oxynitride impregnant particles. In addition, it was found that the actual penetration produced by this method was less than 0.5 mm.

In other approaches, refractory silicon carbide elements as described in U.S. Pat. No. 3,492,153 are protected by reacting aluminum vapor with nitrogen gas within the pores of the silicon carbide article to form in-situ aluminum nitride. However, this structure does not have an acceptable life in a gas oven environment because of the reactivity between the water vapor in the gas flame and the aluminum nitride impregnant.

Attempts to make igniters more resistant to oxidative deterioration are also shown in U.S. Pat. Nos. 3,509,072; 3,875,476; 4,120,829; and 4,204,863. As each of these disclosures describes the use of various bonding compositions to improve serviceability, the electrical characteristics of the resulting igniters are materially altered.

The solution to peripheral oxidation proposed by U.S. Pat. No. 4,429,003 (Fredriksson III) comprises coating the porous SiC igniter with a slurry of fine silicon carbide particles. The slurry (which is applied by spraying, painting or vacuum impregnation), reportedly flows substantially through the entire porous phase of the body. The treated article is then subjected to an oxidizing atmosphere to convert the silicon carbide particles to silica. Since the silica molecules occupy more space than the SiC particles that were oxidized, their in-situ formation can seal off the pores from further diffusion of oxygen. However, it was found that the resulting silica layer tended to devitrify and undergo a phase change in use, and so was prone to flaking, thereby exposing the underlying igniter to an oxidizing environment. Other methods of providing a protective silica layer have also produced the problematic flaking.

In addition, it has been found that the methods of coating favored by the prior art (e.g., brushing or vacuum infiltration) fail to fully infiltrate the protective particles fully into the porosity of the conventional SiC igniter.

Sealing the porosity of the conventional SiC igniter with an external layer of CVD SiC has been proposed. However, not only is this method expensive, the resulting coated igniters have been found to display inconsistent aging behavior.

Therefore, there is a need for a porous silicon carbide igniter which is more resistant to aging. In particular, there is a need for a material which will remain within 4% of its original design resistivity over 6000 hours of cycling (5 minutes on, 5 minutes off) at a service temperature of 1480° C.

SUMMARY OF THE INVENTION

It has been unexpectedly found that infiltrating the open porosity of the conventional recrystallized porous SiC body with fine SiC particles, and then recrystallizing the infiltrated particles to form a second layer of recrystallized SiC produces a new SiC material having superior aging resistance. In particular, this new material was found to have stayed within only about 4% of its original design resistivity over 6000 hours of cycling (5 minutes on, 5 minutes off) at a service temperature of 1480° C.

For the purposes of the present invention, the conventional recrystallized porous SiC body will be called the "first fired" body, and the body produced by subsequent infiltration and recrystallization of the first fired body will be called the "final fired" or "refired" body.

Without wishing to be tied to a theory, it is believed that the second (or "outer") layer of recrystallized SiC decreases the internal porosity of the first fired body, thereby reducing the total surface area available for oxidation. Since the amount of oxidation which occurs in a given body is proportional to the amount of surface area available for oxidation in the body, this reduction porosity thereby reduces the oxidation which takes place in the body and thereby reduces the aging.

In that the added layer of silicon carbide is a semiconductor, the small change in resistivity in the re-fired body observed during life testing is surprising in light of the teachings of the art, which taught that protective coatings applied to resistive ceramics should be electrical insulators which, if oxidized in use, would not alter the overall resistance of the heating element. Simply, the prior art taught that the added silicon carbide layer would likely oxidize and in doing so would change the electrical characteristics of the element.

It has also been found that using sonication to infiltrate the fine silicon carbide particles into the first fired body results in complete impregnation of that body to depths of more than 1 mm, an advantage not realized by the prior art methods of coating, brushing and vacuum infiltration.

Moreover, it has been found that controlling the extent of the initial recrystallization in the first fired body is also critical to achieving the lowest pore volumes in the re-fired body. The present inventors discovered that when the first fired body is not fully recrystallized (i.e., it has more than 10% fine SiC particles identifiable by optical or scanning electron microscopy of polished cross-sections of the first-fired body), those fines clog the internal pathways of the body, thereby preventing more full penetration of that body during the subsequent infiltration step. The inventors found that when the first fired SiC body is essentially fully recrystallized (and preferably has less than 5 wt % identifiable fines), the absence of fine SiC particles allows more full penetration of the body during impregnation, thereby reducing the porosity in the re-fired body. The present inventors have found that requiring the first fired body to be fully recrystallized allows the porosity in the re-fired body to be reduced from about 14–18 vol % to about 9–11 vol %. Previously, the lowest porosity achievable was about 14 vol %. The present inventors have found that firing to fully recrystallize the fines of the green body can be achieved by firing in nitrogen at times and temperatures sufficient to achieve full recrystallization, or in argon at lower times and temperatures. However, the present inventors have found that performing the first firing step in nitrogen allows for better control of the electrical characteristics of the re-fired body. Other methods of providing full recrystallization may include:

a) firing the material in an atmosphere which increases the surface free energy of the SiC material (i.e., does not provide dangling bond caps), thereby increasing the SiC's reactivity, b) reducing the average grain size of the SiC material in order to increase the surface free energy. This can be done by, for example, either decreasing the average size of the fine fraction or by increasing the fraction of fine grains, and c) infiltrating the internal porosity of the SiC body with a material in which SiC is sufficiently soluble and which also reduces the surface free energy of the SiC, thereby providing for easier dissolution of the fine SiC particles and providing a means for their transport to the coarse SiC grains.

Lastly, the present inventors found that the second recrystallization step undesirably decreased the nitrogen level in the re-fired body, thereby undesirably decreasing the high temperature resistivity of the re-fired body. It was found that adding an aluminum source to either the green body or the impregnation slurry can effectively raise the amount of nitrogen accepted by the first fired body to such a level that the subsequent reduction in nitrogen experienced during the second firing results in the desired amount of nitrogen in the re-fired body.

Therefore, in accordance with the present invention, there is provided a SiC body comprising (and preferably, consisting essentially of):

a) at least 30 wt % coarse silicon carbide particles having a particle size of at least 30 um, and b) a coating of recrystallized alpha silicon carbide which coats and connects the coarse silicon carbide particles throughout the body, wherein the coarse silicon carbide particles and the coating comprise at least 89 vol % of the body.

Preferably, the body further comprises less than 2 wt % free silicon, more preferably less than 0.5 wt %. Also preferably, the coating comprises:

a) an intermediate layer of recrystallized alpha silicon carbide which coats and connects the coarse silicon carbide particles throughout the body, and b) an outer layer of recrystallized alpha silicon carbide which coats the intermediate layer of recrystallized silicon carbide. Preferably, the intermediate SiC layer has less than 10% (more preferably, less than 5 wt %) identifiable fine SiC particles per unit weight of the intermediate recrystallized layer. In preferred embodiments, the outer layer of recrystallized SiC is present throughout the body, and the porosity of the body is between 8 vol % and 10 vol %.

Also in accordance with the present invention, there is provided a process for making an oxidation-resistant SiC body, comprising the steps of:

a) forming a green body comprising fine and coarse SiC particles (preferably further comprising aluminum-containing particles), b) firing the green body to form a recrystallized first-fired SiC body (preferably in nitrogen at a time and temperature sufficient to fully recrystallize the fine SiC particles to form an intermediate recrystallized layer, wherein the intermediate SiC layer has less than 10% identifiable fine SiC particles per unit weight of the intermediate recrystallized layer, c) infiltrating (preferably by sonication) the first fired body with a slurry comprising SiC particles (preferably having a particle size of between 0.2 um and 5 um, more preferably between 0.5 and 3 um, and preferably comprising at least 50 wt % of the slurry) to obtain an impregnated body, and d) firing the impregnated body in a non-oxidizing atmosphere (preferably in nitrogen above 2200° C.) to obtain a re-fired body (preferably, having a porosity of less than 11 vol %).

DETAILED DESCRIPTION OF THE INVENTION

Figure 1A:
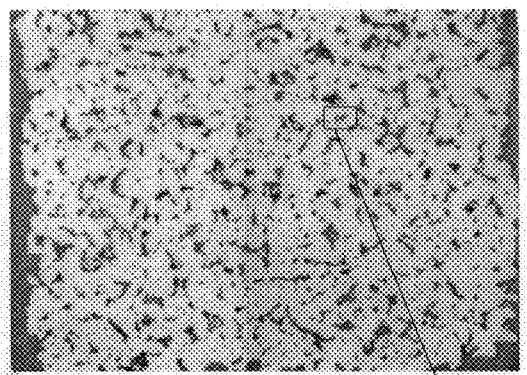
FIGS. 1a and 1b present photomicrographs of a prior art porous silicon carbide ceramic comprising coarse particles 1 and a single layer 2 of silicon carbide thereon which was recrystallized from fine SiC particles. The black regions are porosity 4.

The present invention is typically made by slip casting selected fine and coarse SiC powders into an igniter shape, recrystallizing the green igniter shape to form a first-fired body, impregnating the first-fired body with fine SiC particles, and then recrystallizing the impregnated body to form the re-fired body having superior oxidation resistance.

Preferably, the coarse SiC particles used to make the green body have a particle size of between 30 and 150 um. Their purpose is to form the infrastructure of the recrystallized bodies. SiC Particles above 150 um tend to cause settling problems in slip casting and are also potential flaw sites. SiC particles less than 30 um tend to be too reactive during recrystallization, thereby destroying their ability to form the infrastructure. Preferably, the fine SiC particles used to make the green body have a particle size of less than 10 um, more preferably between 1 and 4 um. If the fine SiC particles are more than 4 um, then it is difficult to sublimate and redeposit them upon the coarse particles, and so high strength is not achieved. If the fine SiC particles are less than 1 um, then they have difficulty remaining deflocculated in the slip casting medium. Typically, the green body comprises at least 30 wt % (and typically between 40 wt % and 60 wt %) coarse silicon carbide grains having a diameter of at least 30 microns, and further comprises at least 30 wt % (preferably, between 40 wt % and 60 wt %) fine SiC particles having a diameter of no more than 10 microns.

Preferably, aluminum-containing particles are also added to the slip and incorporated into the green body. These particles, typically added in the form of alumina or metallic aluminum, allow the first fired SiC body to retain more nitrogen during the initial recrystallization. Typically, these particles are present as between 0.3 wt % and 0.9 wt % of the green body and have a particle size of between 0.5 um and 5 um.

Once the green body is formed into an igniter shape, it is fired in a non-oxidizing atmosphere to recrystallization. This firing is typically performed at temperatures in the range of 2000° C. to 2500° C. Although it has been found that the argon atmosphere allows for the complete recrystallization of the fine SiC particles, thereby eliminating the clogging of the porous pathways during subsequent infiltration, at lower times and temperatures than nitrogen, it has also been found that firing the green body in argon results in a more drastic undesirable reduction in the nitrogen level in the fired body. Therefore, in preferred embodiments, the green body is fired in nitrogen.

Typically, the first fired crystallized silicon carbide comprises at least 30 wt % (and typically between 40 wt % and 60 wt %) coarse silicon carbide grains having a diameter of at least 30 microns, and further comprises between 40 wt % and 60 wt % of a layer of alpha silicon carbide (which was recrystallized from SiC particles having a diameter of no more than 10 microns) coating the coarse silicon carbide particles. Typically, the coarse grains and the recrystallized layer comprise no more than 87 vol % of the body, more typically no more than 86 vol %.

It typically has an open porosity of between 14 vol % and 20 vol % (more typically between 14 vol % and 18 vol %), and its open porosity is characterized by an average (mean) pore size $D_{50}$ of between 5 um and 20 um. If the average pore size is less than about 0.5 um in the ceramic, then complete impregnation is not successfully achieved. To this end, the recrystallization should proceed such that the SiC fines of the green body are "fully recrystallized" such that they form a smooth thin layer which coats the coarse SiC particles of the first fired body. Preferably, the first fired body has less than 5% identifiable fine SiC particles per unit weight of the intermediate recrystallized layer, more preferably less than 1%. The preferred first fired body typically has a 4 point flexural strength of at least about 70 MPa. One preferred porous monolithic ceramic is a recrystallized silicon carbide marketed under the name of CRYSTAR™ by Norton Electronics, Worcester, Mass.

In the next step of the process of the present invention, fine silicon carbide particles are used to infiltrate the first fired body. These infiltrant particles are characterized by an average particle size $D_{50}$ of between about 0.2 um and about 5 um, preferably between 0.5 um and 3 um. If the average particle size is larger than about 5 um, the particles tend to clog the porous pathways of the first fired material, and infiltration is not effective. If the average particle size is smaller than about 0.5 um, then the solids loading in the slurry is limited by flocculation, and this limits the total amount of SiC which can be infiltrated. It has been found that the infiltrated body has a higher density when the $D_{50}$ is increased from about 0.3–0.6 um to about 1 um. This change resulted in a density increase from 2.69 g/cm$^3$ to 2.75 g/cm$^3$. Therefore, in particularly preferred embodiments, the $D_{50}$ is between 0.7 um and 3 um. Preferably, the fine silicon carbide particles fill at least 50% of the open porosity of the porous monolithic ceramic.

Preferably, the slurry used to impregnate the porous ceramic is aqueous based, and contains between 50 wt % and 70 wt % solids of the fine silicon carbide particles to be impregnated. If the solids loading is less than 50 wt %, the porosity in the infiltrated first fired body can not be lowered from about 14 vol % to less than 10 vol %. Conversely, when the solids loadings exceed about 70 wt % of the slurry, the solids were observed to collect on the surface of the first fired body, thereby impeding infiltration of the slurry into the body. In some embodiments, slurry impregnation may be enhanced by controlling the surface tension of pore surface. This can be achieved by using surfactants such as such as sodium hydroxide in concentrations ranging from 0.25 wt % to 1.0 wt % of the slurry. If aluminum is added to the slurry to adjust electrical properties, then the slurry further comprises between 0.01 wt % and 3 wt % aluminum, as alumina.

Preferably, infiltration of the fine silicon carbide particles into the open porosity of the porous monolithic ceramic is aided by sonication. It has been unexpectedly found that exposing a conventional porous recrystallized silicon carbide ceramic to the slurry comprising fine silicon carbide particles and then sonicating the slurry produces an impregnated body whose porosity has been more completely penetrated than that achieved through prior art methods. Whereas the prior art methods of coating, dipping, and vacuum impregnation provided at most 0.1 mm penetration of the conventional porous recrystallized silicon carbide, the sonication method of the present invention provides penetration on the order of at least 10 mm. In preferred embodiments, sonication of the slurry is undertaken at a frequency and power sufficient to ensure that the SiC particulates contained in the slurry remain in suspension for the entire sonication period and that air bubbles which may be trapped in the internal porosity of the igniter are removed by agitation. If the sonication intensity is too low, then sufficient infiltration is not achieved.

If the sonication intensity is too high, then the body may sustain damage such as cracks.

Therefore, in accordance with the present invention, there is provided a method of making an impregnated body comprising the steps of:

a) providing a porous ceramic having open porosity, b) exposing the porous ceramic to a slurry comprising fine ceramic particles, and c) sonicating the slurry to substantially penetrate the fine ceramic particles into the porosity of the porous ceramic and produce the impregnated body.

Once the fine silicon carbide particles are infiltrated, the impregnated body is refired in a non-oxidizing environment. While the high temperature has the effect of sublimating the fines, the non-oxidizing atmosphere insures that their recrystallization upon the coated coarse particles produces recrystallized alpha silicon carbide, and not silica. As noted above, it has been found that oxide layers tend to flake off the porous silicon carbide monolithic ceramic. Preferably, the impregnated body is refired in a furnace having a 1 torr nitrogen atmosphere at least about 2200° C. for about 30 minutes. As SiC fines tend to be reactive, it is preferable that the refiring step produce essentially complete recrystallization of the fine infiltrated SiC particles (i.e., less than 5 wt % identifiable SiC fines per unit weight of the second recrystallized layer, and preferably less than 1 wt %).

Preferably, refiring the impregnated body at a temperature of at least 2200° C. in nitrogen (or, in some embodiments, no more than 2000° C. in argon) increases the extent of recrystallization of the infiltrated fines. Usually, refiring results in a larger average pore size. Below this critical temperature, the refired body usually has at least 10 wt % identifiable fine SiC particles per unit weight of the outer layer.

The refired body of the present invention comprises:
a) at least 30 wt % (preferably between 40 and 60 wt %) coarse silicon carbide particles having a particle size of at least 30 um,
b) an intermediate layer of recrystallized alpha silicon carbide coating the coarse silicon carbide particles, and
c) an outer layer of recrystallized alpha silicon carbide coating the first layer of recrystallized silicon carbide. The coarse fraction, intermediate layer and outer layer amount to at least 89 vol % of the body, leading to a porosity of less than 11 vol % (due to complete impregnation of fine SiC). Preferably, the intermediate layer comprises between 40 and 60 wt % of the refired body. Preferably, the intermediate SiC layer is fully recrystallized (to allow the subsequent complete impregnation of fine SiC). Preferably, the refired SiC body has a thickness of more than 1 mm (and preferably more than 2 mm) and outer layer of recrystallized alpha silicon carbide coats the intermediate layer throughout the body (achievable by sonication). Although not particularly preferred, the remaining porosity of the refired body can be siliconized to essentially zero porosity.

If desired, the process of SiC infiltration followed by refiring in a non-oxidizing atmosphere can be repeated upon the product of the present invention in order to further enhance the density and decrease the porosity of the SiC body.

In typical applications, the room temperature resistivity of pure silicon carbide is too high to allow sufficient current to flow so as to provide a good response time, while the high temperature resistivity may be too high to provide heat. Therefore, in some embodiments, the ceramic body of the present invention is doped with both aluminum and nitrogen. The aluminum dopant decreases the room temperature resistivity and influences the high temperature resistivity of the silicon carbide through the aluminum/nitrogen ratio.

The aging performance of igniters used in gas stoves is typically measured by the change in amperage though the igniter after repeated cycling in air at its design temperature (about 1400 C), wherein a cycle consists of switching the igniter "on" for five minutes and then switching it "off" for five minutes (with forced fan cooling to bring the igniter to room temperature prior to the next "on" cycle). It has been found that the recrystallized silicon carbide igniters produced in accordance with the present invention will undergo a significantly less drastic amperage change after 6000 cycles in comparison with the conventional product.

Therefore, in accordance with the present invention, there is provided a method of using a hot surface element, comprising the steps of:

a) providing a hot surface element comprising a pair of terminal ends and a hot zone therebetween, the hot zone comprising the recrystallized silicon carbide ceramic of the present invention, and
b) providing a voltage between the pair of terminal ends of the hot surface element to increase the temperature of the hot surface element to at least 1400° C., whereby the resistivity of the igniter does not increase more than 6% over 6000 cycles.

U.S. Pat. Nos. 3,875,477; 4,187,344; and 4,429,003 are incorporated by reference herein.

For the purposes of the present invention, "Infiltration" and "impregnation" are used interchangeably. Also, the "vol %" of silicon carbide is determined by computer-aided image analysis of polished cross-sections, mercury porosimetry and the like.

Comparative Example I

This comparative Example demonstrates the low oxidation resistance of the uncoated prior art igniter essentially disclosed in Fredrikkson I.

A casting slip is prepared from a preferred composition of 97% to 99.9% weight percent ("wt") of a 50% mixture of high purity 3.0 micron silicon carbide powder and coarse 100 F silicon carbide powder, and 0.05–0.50 w/o alumina. The preparation of the slip, and the casting thereof into plaster molds follows the teachings of U.S. Pat. No. 2,964,823, the specification of which is incorporated by reference. Preferably, the mold cavity has a cross sectional configuration and dimensions corresponding to the outline of the igniter. The green billet so cast is allowed to stand in the mold for 10 to 15 minutes after which it is removed and air dried for 8 to 16 hours at 125° C. to 150° C. To facilitate slicing of the billet, the billet is impregnated with a 25% solution in isopropyl alcohol of a mixture of 100 parts by weight of Fapreg P3 and 2 parts by weight of Activator, both materials being manufactured and sold by Quaker Oats. The impregnation is carried out by immersion of the green billet in the solution. The saturated billet is heat treated at about 95° C. for at least 12 hours after which temperature is raised to about 190° C. and held for two hours. After the billet cools, it is then sliced into igniter blanks preferably about 0.135 inches in thickness. The slicing is accomplished by a diamond cut off wheel. The green igniters are placed in a graphite holder and fired at 2200° C. to 2450° C. in a reducing atmosphere for 15 to 240 minutes. The fired igniters are subject to a subsequent firing, in nitrogen, at 1500 to 2000° C. for 15 to 180 minutes, maintaining the nitrogen environment until the temperature has dropped to 800° C.

Figure 1B:
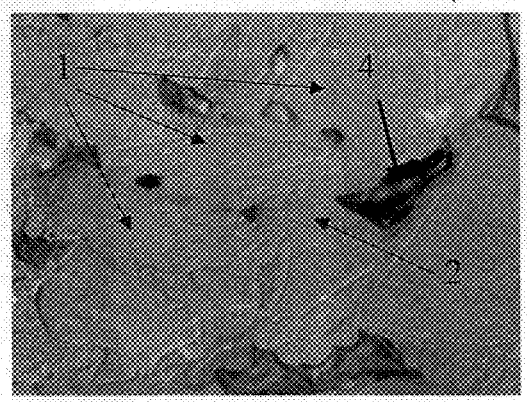

A cross-section of the resulting body was polished, and the microstructure thereof is shown in FIG. 1.

The resulting body was then shaped into an igniter shape and underwent life testing which included cycling for 5 minutes on, 5 minutes off at 1450° C. The resistivity of the life tested igniter increased about 8–15% over 6000 cycles.

Comparative Example II

This comparative Example demonstrates the inferior result obtained when SiC particles are infiltrated by vacuum impregnation, as taught in Fredrikkson III.

A porous SiC body was produced in substantial accordance with Comparative Example I, and was then subject to vacuum infiltration as substantially taught in Fredrikkson III.

Microstructural analysis of the impregnated body indicated vacuum infiltration of the slurry failed to decrease the porosity of the interior of the body by a measurable amount.

This demonstrates that vacuum infiltration fails to provide substantial penetration of the SiC body.

Comparative Example III

This comparative Example demonstrates the inferior result obtained when SiC particles are infiltrated by brushing, as taught in Fredrikkson III.

A porous SiC body was produced in substantial accordance with Comparative Example I, and was then subject to brushing as substantially taught in Fredrikkson III. The resistivity of the life tested igniter increased about 6–12% over 6000 cycles.

Microstructural analysis of the impregnated body indicated less than 1 mm of SiC infiltration.

This demonstrates that bushing a slurry onto the porous body fails to provide substantial penetration of the SiC body.

Comparative Example IV

This comparative Example demonstrates the inferior result obtained when submicron SiC particles are added to the standard bimodal green body.

A SiC green body was produced in substantial accordance with Comparative Example I, and then an attempt was made to infiltrate submicron SiC particles into that green body via sonication with a 50 wt % solids fine SiC slurry.

The fine SiC did not infiltrate the green body. The fine SiC only layed upon the surface of the green body as a cast layer. This is thought to be due to the much finer pore size of the green body (about 0.2 microns) as compared to the final body (15 microns). Thus, the pore channels are too fine to accommodate fine SiC penetration.

This demonstrates that simply adding finer particles to the standard green body does not result in an increased density green body.

EXAMPLE I

This example demonstrates the superior oxidation resistance of the SiC igniter made by infiltrating a porous SiC body with fine SiC particles by sonication, and then refiring the infiltrated body.

The teachings of Comparative Example I were first followed to produce a porous SiC body having about 16 vol % porosity. Thereafter, the SiC body was placed in a slurry containing about 60 wt % silicon carbide having a narrow particle size distribution, and the slurry was sonicated to produce the infiltrated body shown in FIG. 2. Next, the infiltrated body was fired at about 2400° C. in flowing nitrogen at atmospheric pressure for about 30 minutes.

Figure 2A:
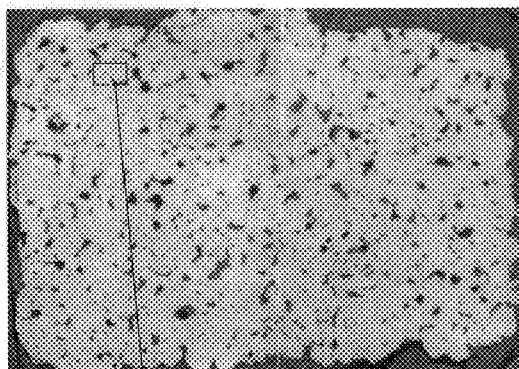
FIGS. 2a and 2b present photomicrographs of a refired body of the present invention comprising coarse SiC particles 11, an intermediate layer 12 of recrystallized alpha silicon carbide which coats and connects the coarse silicon carbide particles throughout the body, and an outer layer 13 of recrystallized alpha silicon carbide which coats the intermediate layer of recrystallized silicon carbide. The black regions are porosity 14.
Figure 2B:
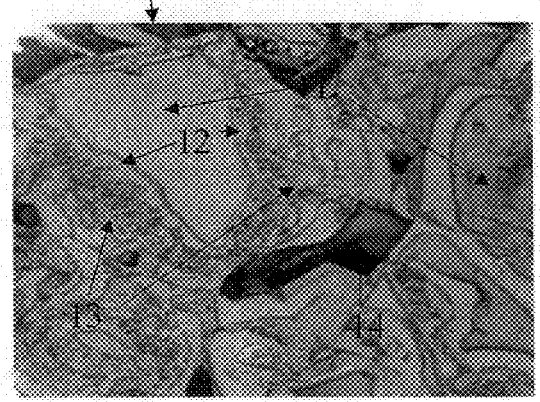

A cross section of the resulting body was polished, and the polished microstructure is shown in FIG. 2. The outer layer of recrystallized SiC fines is believed to be shown as 13.

One resulting body having an igniter shape underwent life testing which included cycling for 5 minutes on, 5 minutes off at 1450° C. The resistivity of the life tested igniter increased only about 4% over 6000 cycles.

EXAMPLE II

This Example discloses a twice-infiltrated/refired embodiment of the present invention.

Example I above was followed, and then the infiltration and refiring steps were repeated. There was 1.5% less porosity as determined by mercury porosimetry and a median pore size of 13 micron as compared to about 17 microns for a single treatment. For the life test at an operating temperature of about 1450° C., there was no statistically significant improvement over the single infiltrated and refired.

EXAMPLE III

This Example demonstrates the superior result obtained when a higher solids loading is used.

Figure 3:
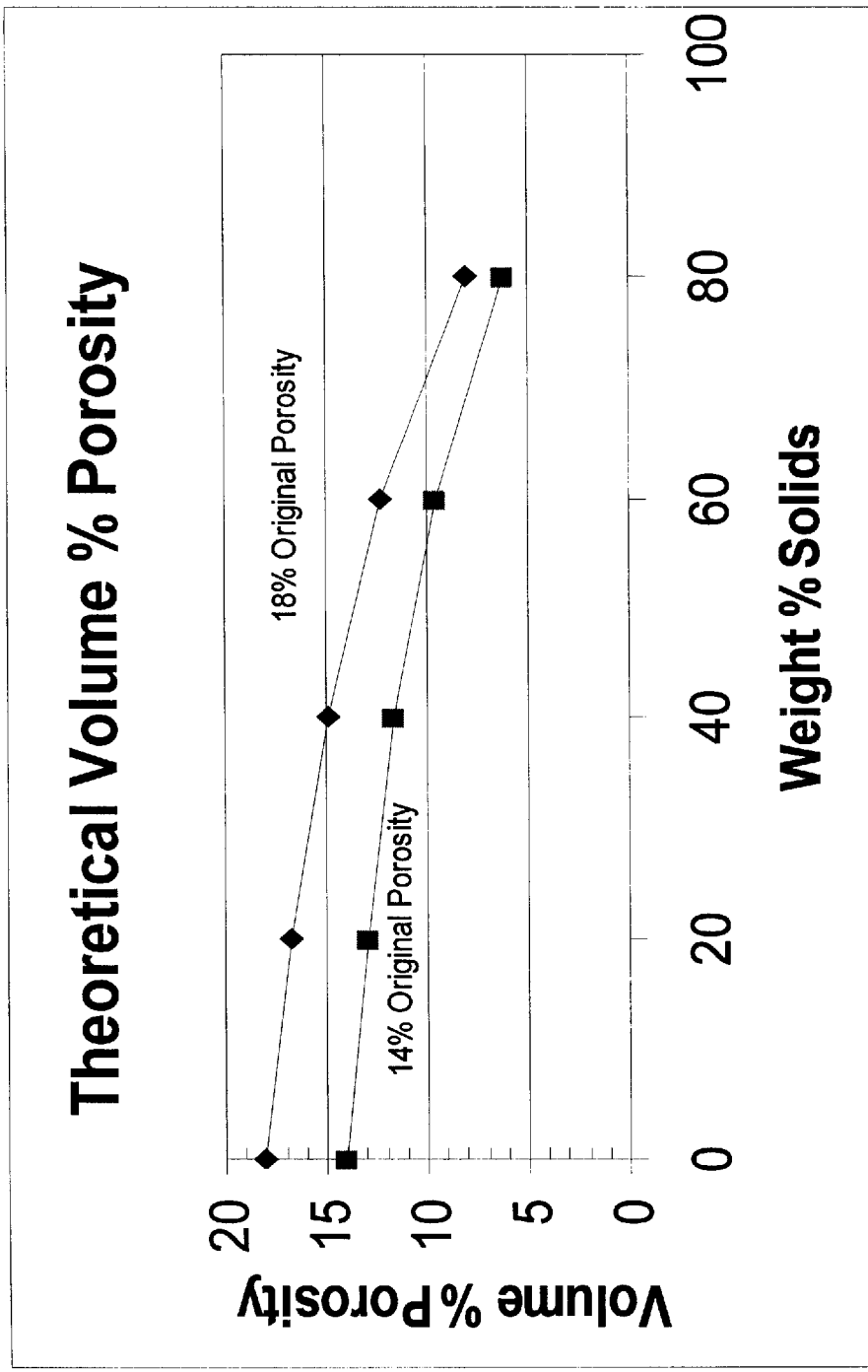
FIG. 3 is a graph representing the theoretical reduction in porosity for different solids loadings due to infiltration of the first fired body.

Example I was substantially followed, except that a range of solids loadings from 20 wt % to 80 wt % SiC was used. In order to predict the theoretical reduction in porosity as a function of solids loading, it was assumed that the SiC slurry fills the internal porosity of the first fired body. Then, assuming a starting porosity of between 14 vol % and 18 vol %, the theoretical limit in reduction of the internal porosity can be calculated, as shown in FIG. 3.

Figure 4:
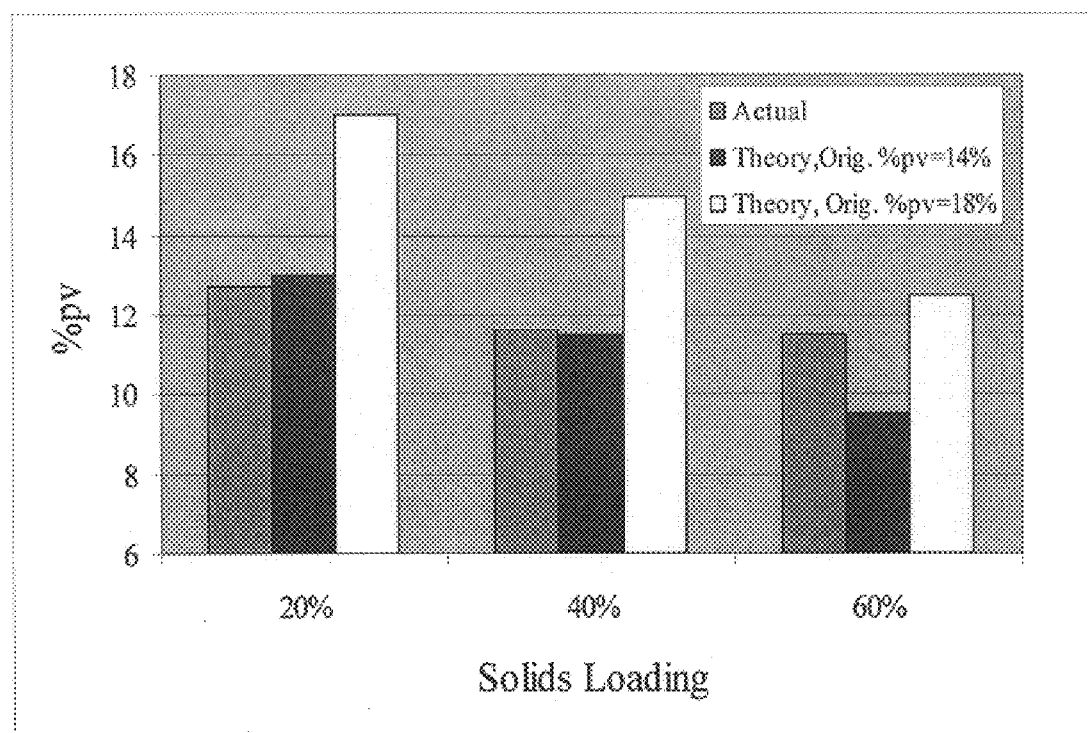
FIG. 4 is a graph representing the actual reduction in porosity for different solids loadings due to infiltration of the first fired body.

First fired samples having a porosity of about 14–16 vol % were impregnated with slurries of 20 wt %, 40 wt %, 60 wt % and 80 wt % solids. The samples were then re-fired. Representative samples were prepared for polished cross-sections and pore volumes were determined using computer-aided image analysis. The actual reduction in pore volume as a function of solids loading in FIG. 4. Essentially no reduction in pore volume was observed in the sample treated with a solids loading of 80 wt % due to the fact that the slurry was unable to infiltrate the interior of the first fired body.

Representative re-fired samples were life-tested at about 1450° C. with a 5 minutes on/5 minutes off cycle in air. At 6,000 cycles, the 20 wt % solids loading sample displayed an aging deterioration of about 8% (essentially the same as the untreated sample), the 40 wt % sample displayed aging deterioration of about 7%, and the 60 wt % sample about 4.5%.

This demonstrates that providing higher solids loading reduces the internal porosity and increases aging resistance.

Comparative Example V

This comparative example demonstrates the increased oxidation resistance afforded by refiring the infiltrated body in nitrogen.

Example I was substantially followed, except that the infiltrated body was not subject to refiring.

The resulting body was then shaped into an igniter shape in accordance with Example I, and underwent life testing which included cycling for 5 minutes on, 5 minutes off at 1450° C. The resistivity of the life tested igniter increased about 8% over 6000 cycles. Microstructural analysis of the life tested body indicated that there was significant oxidation of the SiC due to devitrification, flaking and oxide incoherency. The oxides did not provide the same level of oxidation resistance as the present invention.

After cutting, mounting and polishing the cross-section, microstructural analysis of the life tested body indicated that the fine, infiltrated SiC was almost completely oxidized in the hottest portion of the igniter. Also, there was a significant amount of cracking that occurred in the polished section, indicating the presence of residual stress due to the thermal expansion mismatch between SiC and $SiO_2$ or due to the phase inversions that can occur in crystalline $SiO_2$.

Comparative Example VI

This comparative example demonstrates the increased oxidation resistance afforded by using silicon carbide particles as the infiltrant, followed by refiring in a non-oxidizing atmosphere.

Example I was substantially followed, except that 0.02 um silica particles were used as the infiltrant media.

The resulting body was then shaped into an igniter shape in accordance with Example I, and underwent life testing which included cycling for 5 minutes on, 5 minutes off at 1450° C. The resistivity of the life tested igniter increased about 8% over 6000 cycles.

EXAMPLE IV

This Example demonstrates the superior result obtained when the SiC particles to be infiltrated have a narrow particle size distribution.

Example I was substantially followed, except that the particle size distribution of the SiC particles in the infiltration slurry was narrowed from 0.2–1.5 um to 0.8–1.5 um, thereby increasing the $D_{50}$ from 0.6 to 1.0 um.

Microstructural analysis of the resulting body indicated an increase in density from 2.69 g/cc to 2.75 g/cc.

This demonstrates that providing a narrow particle size distribution which increases the $D_{50}$ to above 0.7 um increases the effectiveness of the treatment.

EXAMPLE V

This Example demonstrates the superior result obtained when an insufficiently low refire temperature is used.

Example I was substantially followed, except that a lower refire temperature of about 2000° C. (about 450° C. lower than normal) was used.

Microstructural analysis of the resulting body indicated no recrystallization occurred.

This demonstrates that providing a higher refire temperature is necessary to achieve recrystallization.

We claim:

1. A ceramic body comprising:
   a) at least 30 wt % coarse silicon carbide particles having a particle size of at least 30 um,
   b) a coating of recrystallized alpha silicon carbide which coats and connects the coarse silicon carbide particles throughout the body,
   wherein the coarse silicon carbide particles and the coating comprise at least 89 vol % of the body.

2. The body of claim 1 further comprising less than 2 wt % free silicon.

3. The body of claim 1 consisting essentially of:
   a) at least 30 wt % coarse silicon carbide particles having a particle size of at least 30 um,
   b) a coating of recrystallized alpha silicon carbide which coats and connects the coarse silicon carbide particles throughout the body.

4. The body of claim 1 wherein the coating comprises:
   a) an intermediate layer of recrystallized alpha silicon carbide which coats and connects the coarse silicon carbide particles throughout the body, and
   b) an outer layer of recrystallized alpha silicon carbide which coats the intermediate layer of recrystallized silicon carbide.

5. The ceramic body of claim 4 wherein the intermediate SiC layer has less than 10% identifiable fine SiC particles per unit weight of the intermediate recrystallized layer.

6. The ceramic body of claim 4 wherein the intermediate SiC layer has less than 5% identifiable fine SiC particles per unit weight of the intermediate recrystallized layer.

7. The ceramic body of claim 4 wherein the body has a thickness of at least 1 mm, and the outer layer coats the intermediate layer throughout the body.

8. The ceramic body of claim 4 wherein the coarse grains and the intermediate layer comprise no more than 87 vol % of the body.

9. The ceramic body of claim 4 wherein the coarse grains and the intermediate layer comprise no more than 86 vol % of the body.

10. The ceramic body of claim 1 wherein the coarse SiC particles comprise between 40 wt % and 60 wt % of the total SiC content, and the recrystallized coating comprises between 40 wt % and 60 wt % of the total SiC content.

11. The ceramic body of claim 1 having a total porosity of between 8 vol % and 10 vol %.

12. A ceramic body comprising:
   a) at least 30 wt % coarse silicon carbide particles having a particle size of at least 30 um,
   b) an intermediate layer of recrystallized alpha silicon carbide which coats and connects the coarse silicon carbide particles, and
   c) an outer layer of recrystallized alpha silicon carbide coats the intermediate layer of recrystallized silicon carbide.

* * * * *